(12) United States Patent
Barboi et al.

(10) Patent No.: US 11,005,849 B1
(45) Date of Patent: May 11, 2021

(54) DISTRIBUTED DIRECTORY CACHING TECHNIQUES FOR SECURE AND EFFICIENT RESOURCE ACCESS

(71) Applicant: CyberArk Software Ltd., Petach-Tikva (IL)

(72) Inventors: Dima Barboi, Tel Aviv (IL); Arthur Bendersky, Tel Aviv (IL); Tal Zigman, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/916,881

(22) Filed: Jun. 30, 2020

(51) Int. Cl.
*H04L 29/06* (2006.01)
*H04L 29/08* (2006.01)

(52) U.S. Cl.
CPC ........ *H04L 63/102* (2013.01); *H04L 63/0435* (2013.01); *H04L 63/0823* (2013.01); *H04L 63/12* (2013.01); *H04L 63/20* (2013.01); *H04L 67/2842* (2013.01); *H04L 67/42* (2013.01)

(58) Field of Classification Search
CPC .............. H04L 63/102; H04L 63/0823; H04L 67/2842; H04L 63/0435; H04L 63/20; H04L 67/42; H04L 63/12
See application file for complete search history.

(56) References Cited

U.S. PATENT DOCUMENTS

| | | | |
|---|---|---|---|
| 5,933,849 A | 8/1999 | Srbljic et al. | |
| 6,401,211 B1 * | 6/2002 | Brezak, Jr. | G06F 21/33 726/17 |
| 7,209,970 B1 * | 4/2007 | Everson | H04L 29/12009 703/4 |
| 7,340,600 B1 * | 3/2008 | Corella | H04L 63/0823 713/155 |
| 7,502,832 B2 | 3/2009 | San Andres et al. | |
| 7,797,495 B1 | 9/2010 | Lepak | |
| 7,966,487 B2 * | 6/2011 | Engberg | H04L 9/3268 713/156 |
| 2002/0099671 A1 * | 7/2002 | Mastin Crosbie | G06Q 99/00 705/500 |
| 2002/0112185 A1 * | 8/2002 | Hodges | H04L 67/02 726/23 |
| 2002/0166049 A1 * | 11/2002 | Sinn | H04L 67/306 713/175 |
| 2002/0194471 A1 * | 12/2002 | Benantar | H04L 63/20 713/158 |

(Continued)

OTHER PUBLICATIONS

"AD Agent: Overview", Trustwave, https://www3.trustwave.com/software/8e6/hlp/adagent/1overview.html.

(Continued)

*Primary Examiner* — Chau Le
*Assistant Examiner* — Thomas Ho
(74) *Attorney, Agent, or Firm* — Finnegan, Henderson, Farabow, Garrett & Dunner LLP

(57) ABSTRACT

The disclosed embodiments relate to systems and methods for secure and efficient resource access using distributed directory caching techniques. Techniques include obtaining, from a directory service, client directory data associated with a client; providing the client directory data to a computing device associated with the client for caching on the computing device; identifying a request from the client; receiving, from the computing device, the client directory data that was cached on the computing device; and evaluating the request based on the received client directory data.

20 Claims, 10 Drawing Sheets

(56) References Cited

U.S. PATENT DOCUMENTS

| | | | |
|---|---|---|---|
| 2007/0083749 A1* | 4/2007 | Fang | H04L 63/0442 713/152 |
| 2013/0339740 A1* | 12/2013 | Ben-Shalom | H04L 63/205 713/175 |
| 2017/0230307 A1* | 8/2017 | Li | H04L 47/80 |
| 2018/0145960 A1* | 5/2018 | Bakshan | H04L 63/20 |

OTHER PUBLICATIONS

"Mapping Active Directory Domain Services Attributes to Properties in System Center—Service Manager," Oct. 12, 206, https://docs.microsoft.com/en-us/system-center/scsm/ad-ds-attribs?view=sc-sm-2019.

"Directory Service", accessed Jun. 30, 2020, https://en.wikipedia.org/wiki/Directory_service.

"Defining Terms: What is a Directory Service?," accessed Jun. 30, 2020, https://www.dummies.com/programming/networking/defining-terms what is a directory-service/.

Moreau, L., "Distributed Directory service and message routing for mobile agents," Science of Computing Programming 39, 2001, pp. 249-272.

Fitzgerald, S. et al, "A Directory Service for Configuring High-Performance Distributed Computations", U.S. Department of Energy Office of Scientific and Technical Information, Jul. 7, 1997, pp. 1-11, https://www.osti.gov/servlets/purl/508115.

Douceur, J. and Jon Howell, "Distributed Directory Service in the Farsite File System," Nov. 2006, Proceedings of the 7th Symposium on Operating Systems Design and Implementation (OSDI), pp. 1-14, https://www.microsoft.com/en-us/research/publication/distributed-directory-service-in-the-farsite-file-system/.

\* cited by examiner

DISTRIBUTED DIRECTORY CACHING TECHNIQUES FOR SECURE AND EFFICIENT RESOURCE ACCESS

BACKGROUND

Modern computer systems may include a variety of resources such as services, users, programs, networks, and the like. To manage these various resources, the system may implement a directory service to store information related to the resources within the network. The information stored by the directory service may be used by users to access various resources.

Some larger systems may implement a third-party security service to manage access to the system. However, this requires giving a security service agent access to the directory service (e.g., Microsoft Active Directory™). Accordingly, the information of the directory service is often stored in a central location of the security service in order for the security service to effectively manage the system. Not only does this centralized storage location increase the potential attack surface of the system, but it may also result in inefficiencies and require management of separate privileged accounts for each user of the system. In some cases, the central storage location may become overloaded with requests from a large number of users, which can result in additional inefficiencies, slow speeds, and unreliability.

Accordingly, in view of these and other deficiencies leading to system inefficiency and security vulnerabilities, technological solutions are needed for secure and efficient resource access. Solutions should permit users or other clients to gain access to resources on a system while distributing the storage of directory data. Solutions should advantageously permit directory data to be cached locally on a client device for later use to access system resources. Solutions should advantageously minimize the directory data stored by a central security agent.

SUMMARY

The disclosed embodiments describe non-transitory computer readable media, systems, and methods for secure and efficient resource access using distributed directory caching techniques. For example, in an exemplary embodiment, there may be a non-transitory computer readable medium including instructions that, when executed by at least one processor, may cause the at least one processor to perform operations for managing distributed directory data. The operations may comprise obtaining, from a directory service, client directory data associated with a client; providing the client directory data to a computing device associated with the client for caching on the computing device; identifying a request from the client; receiving, from the computing device, the client directory data that was cached on the computing device; and evaluating the request based on the received client directory data.

According to a disclosed embodiment, the operations may further comprise determining, based on the client directory data that was cached on the computing device, whether the client is permitted to access a secure target resource in response to the request.

According to a disclosed embodiment, the request from the client may be a request for enrollment of the client in a security service.

According to a disclosed embodiment, the operations may further comprise, before providing the obtained client directory data to the computing device: sending the obtained client directory data associated with the client to a certificate authority, and receiving, from the certificate authority, a signed version of the client directory data.

According to a disclosed embodiment, the client directory data provided to the computing device may be the signed version of the client directory data.

According to a disclosed embodiment, the client directory data received from the computing device may be the signed version of the client directory data.

According to a disclosed embodiment, the operations may further comprise verifying, based on the certificate authority, the signed version of the client directory data received from the computing device.

According to a disclosed embodiment, the client directory data may include at least one of: privileges data, privileged membership data, password data, or personal data.

According to a disclosed embodiment, the operations may further comprise updating a separate directory resource based on the obtained client directory data.

According to a disclosed embodiment, the providing the client directory data to the computing device associated with the client may occur on a periodic basis.

According to another disclosed embodiment, a method may be implemented for managing distributed directory data. The method may comprise obtaining, from a directory service, client directory data associated with a client; providing the client directory data to a computing device associated with the client for caching on the computing device; identifying a request from the client; receiving, from the computing device, the client directory data that was cached on the computing device; and evaluating the request based on the received client directory data.

According to a disclosed embodiment, the method may further comprise, before providing the obtained client directory data to the computing device, encrypting the obtained client directory data associated with the client.

According to a disclosed embodiment, the client directory data provided to the computing device may be the encrypted version of the client directory data.

According to a disclosed embodiment, the client directory data received from the computing device may be the encrypted version of the client directory data.

According to a disclosed embodiment, the method may further comprise decrypting the encrypted version of the client directory data.

According to a disclosed embodiment, the method may further comprise permitting the client access to a secure target resource conditional on a verification of the decrypted version of the encrypted version of the client directory data.

According to a disclosed embodiment, the client may lack a cryptographic key for decrypting the encrypted version of the client directory data.

According to a disclosed embodiment, the computing device associated with the client may be at least one of: a computing device that locally executes the client or a computing device separate from the client.

According to a disclosed embodiment, the obtaining, from the directory service, the client directory data associated with the client may be performed on a least-privilege basis.

According to a disclosed embodiment, the client directory data associated with the client may have an expiration attribute.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
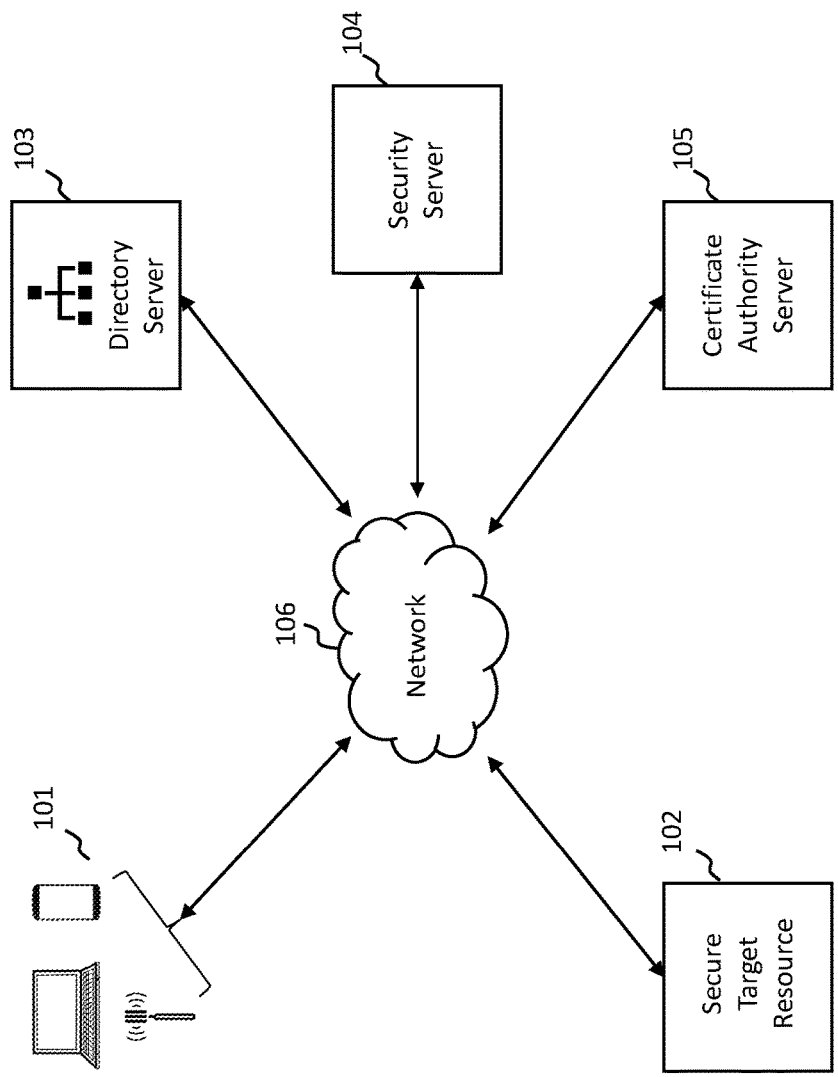
FIG. 1 is a block diagram of an exemplary system for managing distributed directory data in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The distributed directory techniques for secure and efficient resource access, as described herein, overcome several technological problems relating to the security and management of computing systems. As described below, the disclosed embodiments provide techniques for a client to gain access to secure target resources using client directory data cached on a client device. Organizations may have large computing networks with a wide variety of resources and services distributed across the network. The network may use a directory service to store information related to the resources and users within the network. The directory service may include an object corresponding to each network resource. The directory service may also store information or attributes associated with each object. In some cases, the directory service may provide access to control to the various resources within the network.

Some organizations may also utilize a security service to manage access to the network. For example, organizations having networks with a large number of identities or identities requiring remote access to the network may use a cloud-based security service to manage network security. In such instances, the security service needs access to the network's directory service to sufficiently manage the network's security. In such instances, deploying an agent for the security service that has access to the directory service and caches user directory data presents several technological problems related to security, performance, and efficiency of the system. For example, the agent may require a highly-privileged account to properly function and may cache all of the user data directly in its memory. This presents an increased security risk in the event the agent was or will be compromised. Similarly, in such systems, the agent may periodically poll or pull data from the directory service, which could overload directory service server(s). Additionally, deployment of such an agent may require additional resources to properly maintain and update the agent. Such an agent may also cause issues with system reliability. For example, if one centralized agent fails or becomes unavailable, the directory service may become unavailable. Multiple agents might be used to avoid this issue, but such systems result in additional complexity and resource consumption.

Disclosed embodiments address the problems presented by current directory services and agents. Disclosed embodiments implement distributed directory caching techniques where directory data is cached locally on a client device requesting access to a network. The cached data may then later be used in subsequent access requests. Accordingly, disclosed embodiments may provide additional security protection against threats to a network identity because the client may use its own non-privileged credentials to cache directory data related to the client. Thus, the directory data need not be cached by a centralized agent, service, or server. Likewise, disclosed embodiments eliminate the need to manage a privileged account for the client because the process does not require elevated privileges for accessing a directory service. Rather, the client may be authenticated by a security service, which accesses the directory service and provides the attributes to the client for caching on the client's device. Accordingly, disclosed embodiments may employ a just-in-time approach for retrieving data from the directory service, instead of periodic data retrieval. For even additional security, some embodiments may implement digital signatures or encryption to further guard against unauthorized access of the directory data.

Reference will now be made in detail to the disclosed embodiments, examples of which are illustrated in the accompanying drawings.

FIG. 1 is a block diagram of an exemplary system 100 for managing distributed directory data in accordance with disclosed embodiments. System 100 may include one or more of a client device 101, a secure target resource 102, a directory server 103, a security server 104, a certificate authority server 105, and a network 106, as shown in FIG. 1 and discussed further below.

Client device 101 may include a variety of different types of computing devices. For example, client device 101 may be a personal computer (e.g., a desktop or laptop), an IoT device (e.g., sensor, smart home appliance, printer, connected vehicle, industrial device, etc.), a virtual machine (e.g., virtualized computer, container instance, etc.), or similar. Client device 101 may also be a handheld device (e.g., a mobile phone, a tablet, notebook, etc.), a wearable device (e.g., a smart watch, smart jewelry, an implantable device, a fitness tracker, smart clothing, a head-mounted display, etc.), or various other devices capable of processing and/or receiving data. In some embodiments, client device 101 may be a microservice associated with the client. For example, client device 101 may be a microservice associated with the client that is executed in a virtual container instance.

Client device 101 may be associated with one or more users or machines. For example, client device 101 may be used by a human user, identity, application, code instance, virtual machine, etc. For example, client device 101 may locally execute a client application. In some embodiments, client device 101 may be a computing device separate from the user or machine. For example, a client application may be executed on a laptop computer; however, client device 101, which may be used by the user or machine to gain access to secure target resource 102 (as described in greater detail below) may be a mobile device separate from the laptop computer. In accordance with disclosed embodiments, a user or machine may be associated with one or more corresponding identities. Each identity may be associated with one or more permissions, which may permit an identity access to target resources, execute code on a target resource, access or edit certain data, create new permissions or identities, or execute other actions.

Client device 101 may include one or more processors and one or more storage devices. Storage devices of client device 101 may be configured to store instructions used by the processor to perform functions related to the disclosed embodiments. The storage device may be configured to store software instructions, such as programs, that perform one or more operations when executed by the processor. The disclosed embodiments are not limited to particular software programs or devices configured to perform dedicated tasks. For example, the memory may store a single program, such as a user-level application, or may comprise multiple software programs. The memory may also include an operating system such as, for example, a Windows™ operating system, Apple™ operating system, Android™ operating system, Linux operating system, a cloud-based operating system, or other types of operating systems. Additionally, the processor may in some embodiments execute one or more programs (or portions thereof) remotely located from the client device 101. Furthermore, the memory may include one or more storage devices configured to store data. In some embodiments, the storage device may include a storage area corresponding to a specific client or user, which may be used to store client directory data, according to the description below.

Client device 101 may include one or more client applications. A client application may be stored in memory and executed by one or more processors of client device 101. The client application may be, for example, a web browser or other application for connecting to the internet or secure target resource 102. As another non-limiting example, the client application may be a local application (e.g., a word processor) that uses secure target resource 102 for remote storage. The client application may also be a web or cloud-based application accessed by client device 101. A client application may be associated with a security service and may be configured to authenticate a user of the client of the device (e.g., CyberArk Alero™). A user may use client device 101 to authenticate with security server 104 and access secure target resource 102. In some embodiments, system 100 may include multiple client devices 101. For example, a user may use a first client device 101 (e.g., a smartphone) for authentication to gain access to secure target resource 102 on a second client device 101 (e.g., a laptop computer).

System 100 may also include a secure target resource 102. Secure target resource 102 may include various computing resources, storage resources, security services, applications, databases, software code, files, or various other types of resources. In some embodiments, secure target resource 102 may include one or more networks, which may be associated with an organization, service, etc. While in some cases secure target resource 102 may include a variety of real-world devices, in some cases secure target resource 102 may exist entirely in the cloud (i.e., in a virtualized computing environment, such as AWS™, Azure™, IBM Cloud™, etc.). Access to secure target resource 102 may be restricted to prevent access to unauthorized identities. Accordingly, authorized identities may be associated with a variety of privileges that permit the authorized identities to take various actions on secure target resource 102, for example, reading data, storing data, deleting data, executing code, or creating other identities.

System 100 may also include a directory service server 103. Directory service server 103 may be a server associated with a directory service, for example, Microsoft Active Directory™, Trustwave™ AD Agent, OKTA™ LDAP Agent, Apple Open Directory™, or others. In some embodiments, directory service server 103 may be associated with or a part of a cloud application or service. Directory service server 103 may store directory data. Directory data may include information about various associated secure target resources 102. Directory data may also include information about various identities within system 100 and their associated privileges, memberships, etc. For example, directory data may identify each identity within system 100, its privileges, a level of privileges associated with it, the resources it may act upon, privileged groups it is a member of, a role or type of the identity, authentication information associated with the identity (e.g., passwords), and the like. Directory data may also identify personal data, such as a client's name, employee ID, title, network address, IP address, domain, etc. Directory data may also include other metadata related to the client or client device 101. Directory data may be stored and transferred in a variety of formats, including but not limited to CSV, JSON, XML, etc.

System 100 may also include a security server 104 as shown in FIG. 1. Security server 104 may be associated with a security service that manages security and access to system 100. Security server 104 may be a proxy server or centralized server that manages the different components of system 100. When implemented as a proxy server, for example, security server 104 may intercept communications to or from client devices 101 or secure target resource 102, so that the techniques described below may be performed. Alternatively, when implemented as a centralized server, security server 104 may be directly communicated with by client devices 101 or secure target resource 102, without the need to intercept communications. In some embodiments, as described in greater detail below, security server 104 may be configured to authenticate a user of client device 101 and facilitate communications between client device 101, secure target resource 102, and directory server 103.

System 100 may also include a certificate authority server 105. Certificate authority server 105 may manage digital signatures applied to client directory data, as described in greater detail below. Certificate authority server 105 may be associated with a third-party certificate authority that issues digital certificates or applies digital signatures, for example, DigiCert™, IdenTrust™, Comodo™, or others.

Computing device 101, secure target resource 102, directory server 103, security server 104, and certificate authority server 105 may communicate through one or more network 106. Communications over network 106 may occur across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 106 may be a cloud network, (e.g., private cloud, public cloud, or hybrid cloud network), or a combination of these types of networks. In some embodiments, the communications described below may take place across two or more of these forms of networks and protocols.

Figure 2A:
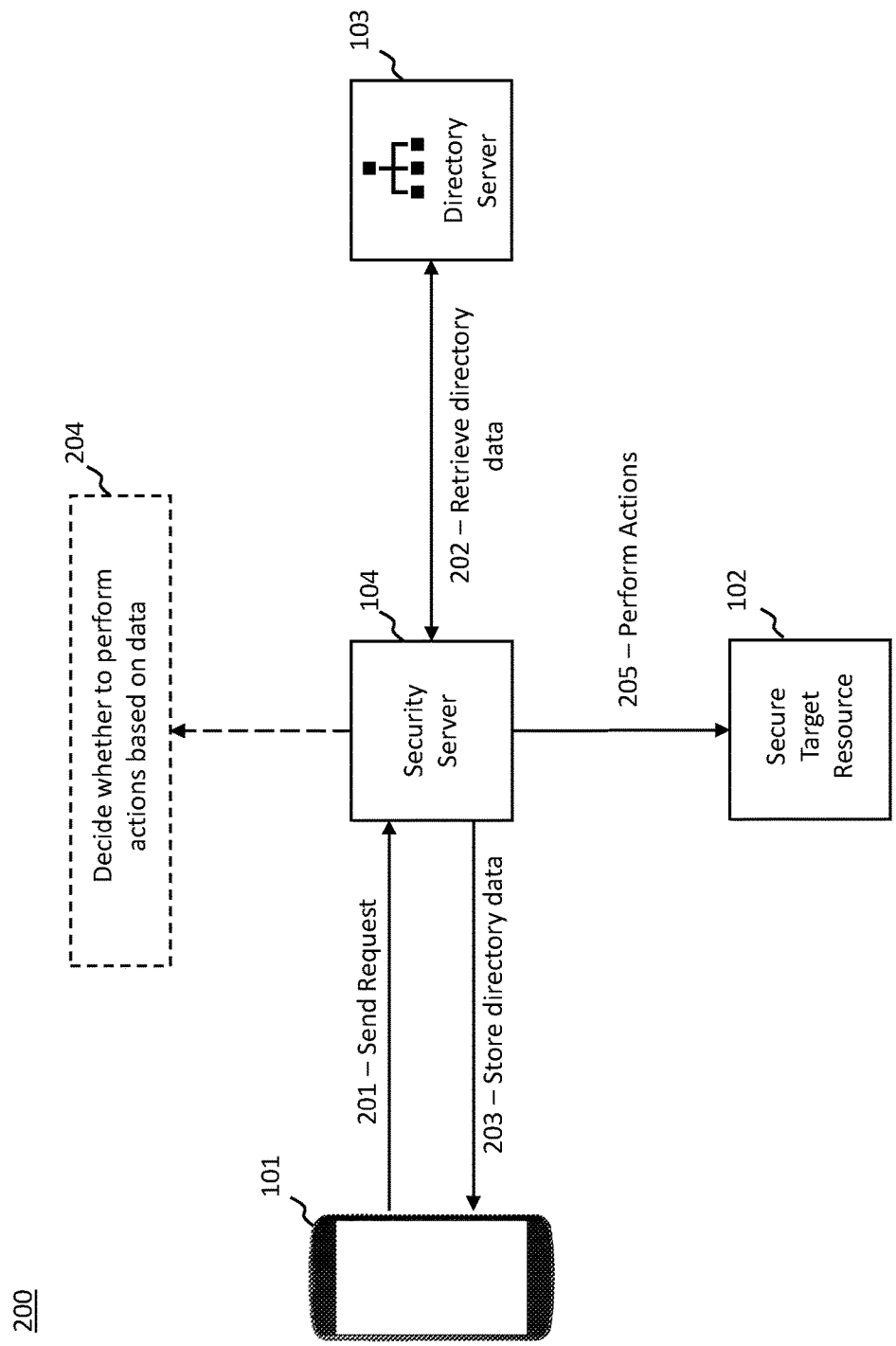
FIG. 2A is a block diagram of an exemplary process for managing distributed directory data in accordance with disclosed embodiments.

FIG. 2A is a block diagram of an exemplary process 200 for managing distributed directory data in accordance with disclosed embodiments. Process 200 may be used, for example, during an enrollment process or to establish an initial connection between a client 101 and secure resource 102.

At step 201, process 200 may include sending a request to security server 104. Client device 101 may send a request to security server 104 requesting authentication and access to secure target resource 102. In some embodiments, the request may be a request for enrollment in a security service. For example, security server 104 may be associated with a third-party security service that manages security for an organization associated with secure target resource 102. The user associated with client device 101 may enroll in the service to gain future access to secure target resource 102 using client device 101.

In some embodiments, the access request in operation 201 may include information corresponding to the user and/or client device 101. For example, the request may include user credentials associated with the user. In some embodiments, the information may include biometric data or biological data (e.g., a fingerprint, facial scan, eye scan, voice recording, and the like). Security server 104 may use the information to authenticate the user.

In other embodiments, such as when the request in operation 201 is an enrollment request, the request may include enrollment information about the user and/or client device 101 that may be used by security server 104 to enroll the user in the security service. For example, the request may include information identifying the user (e.g., name, username, email address, passwords, biometric or biological data, information identifying the client device, etc.). If the client is not already in enrolled with security service, security server 104 may use the enrollment information to enroll the client.

In some embodiments, the request may include an indication that the user is authenticated. For example, client device 101 may include an authentication application (e.g., CyberArk Alero™) associated with the security service. The user may use the authentication application on client device 101 to authenticate with the security service such that credentials or other authentication information need not be provided directly to security server 104. For example, the authentication application may request a biometric or other credential to the application, which the application may use to authenticate the user. In some embodiments, a user may authenticate with the security service using other techniques or protocols. For example, a user may use a web browser on client device 101 to authenticate according to FIDO2 specifications. In this case, the user may authenticate using the FIDO2 protocols on the same device being used to access secure target resource 102, or using an external secondary device. Like the authentication application, the security service may request a biometric attribute, security key, or other credential used to securely authenticate the user.

In some embodiments, after receiving the request, security server 104 may authenticate the user. For example, if the request includes user credentials, the security server 104 may use the credentials to authenticate the user. If the credentials are accurate, the security server 104 may then move to step 202.

In some embodiments, the request may also include information about one or more target resources 102 to which client device 101 requests access or an ability to perform an action. For example, the request may identify an organization's network or a database that the user of client device 101 wishes to access.

At step 202, security server 104 may retrieve directory data associated with the client from directory server 103. Client directory data may include privileges data, privileged membership data, password data, personal data, etc. For example, client directory data may indicate that the client is a member of a certain group of identities with enhanced privileges, e.g., network administrators. Accordingly, the client directory data may indicate what actions the client is permitted to take on secure target resource 102. In some embodiments, obtaining the client directory data may be performed on a least-privilege basis. For example, the privileges required to obtain the client directory data may be minimal. In other words, the client directory data may be accessed using a minimally privileged account. Accordingly, this may eliminate the need to manage many privileged accounts that may present a higher security risk to the system.

In some embodiments, client directory data may include an expiration attribute. An expiration attribute may indicate a certain number of permitted uses or a certain permitted time after which the client directory data may expire and no longer be valid. For example, an expiration attribute may indicate that the client directory data is valid for one day or one week. After that period, the client directory data may no longer be valid, and accordingly, new valid client directory data may need to be obtained from the directory server 103.

In some embodiments, security server 104 may update a separate directory resource based on the obtained client directory data. For example, security server 104 or a security service associated with security server 104 may maintain its own separate directory resource. In some embodiments, a separate directory resource may be associated with secure target resource 102 or directory server 103. The separate directory resource may manage temporary or just-in-time accounts corresponding to clients. For example, when security server 104 receives the client directory data, it may initiate generation of a temporary account corresponding to the client. Security server 104 may use this temporary account to grant the client access to secure target resource 102. For example, it may grant the temporary account the privileges associated with the client as indicated by the client directory data. When the client's session ends, security server 104 may remove the associated temporary account.

At step 203, security server 104 may send the client directory data back to client device 101 for caching. Client device 101 may cache the client directory data locally. In some embodiments, security server 104 may send the client directory to client device 101 on a periodic basis. For example, security server 104 may routinely send the client directory data according to a predetermined schedule or with a predetermined time interval between transmissions.

At step 204, security server 104 may evaluate the request to determine whether client device 101 is authorized to access or take action on secure target resource 102. Security server 104 may make the evaluation based on the client directory data. For example, the client directory data may indicate the privileges associated with an identity associated with client device 101. If the privileges include the requested action in the request, security server 104 may determine that client device 101 may perform the action on secure target resource 102. Accordingly, at step 205, client device 101 may perform the corresponding actions on secure target resource 102. If the client directory data does not indicate that client device 101 is permitted to take the requested actions on secure target resource 102, the security server may deny access to client device 101.

Figure 2B:
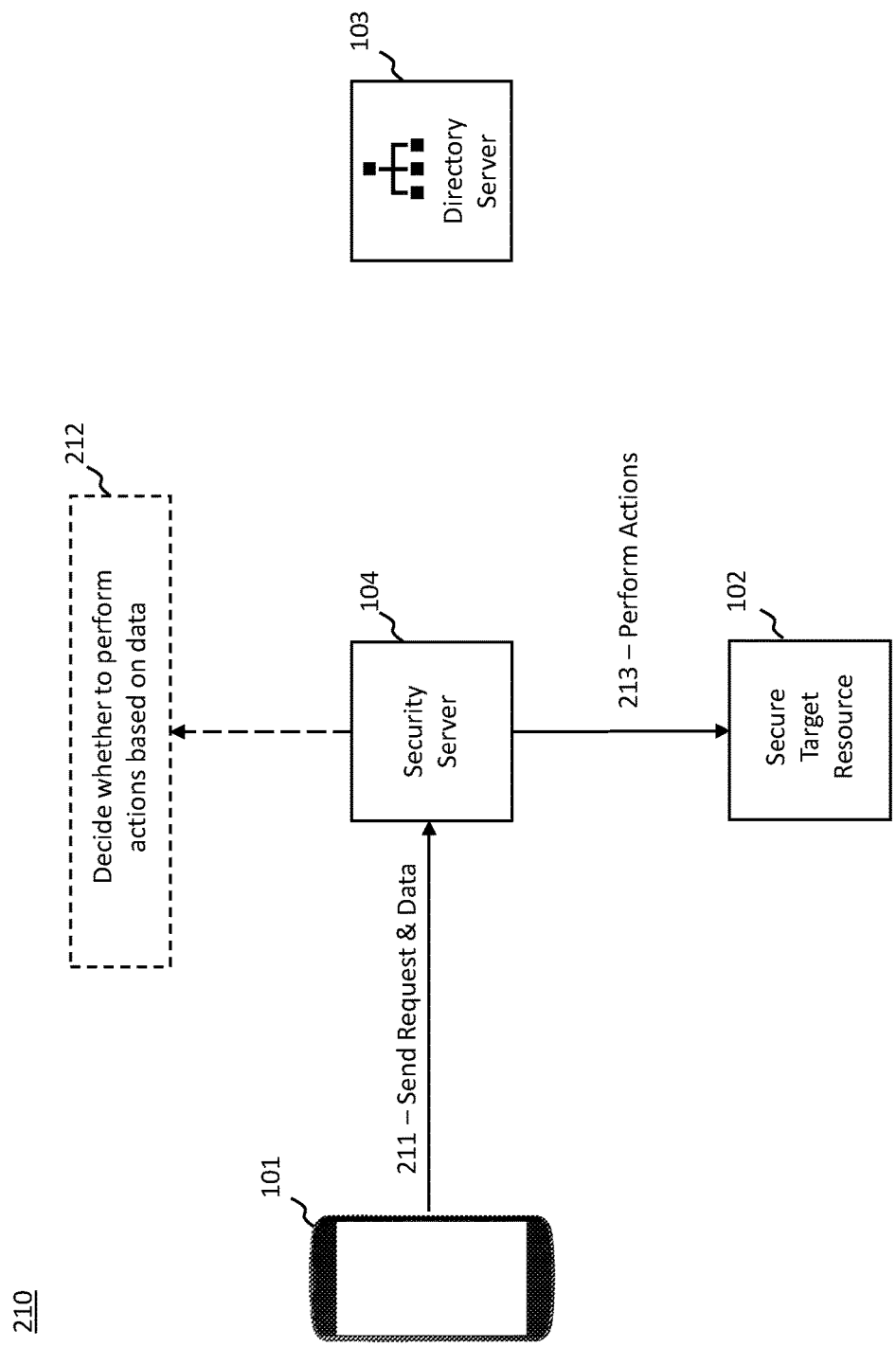
FIG. 2B is a block diagram of an exemplary process for managing distributed directory data in accordance with disclosed embodiments.

FIG. 2B is a block diagram of an exemplary process 210 for managing distributed directory data in accordance with disclosed embodiments. Process 210 may be used for subsequent requests, after an initial request, in response to which client device 101 has received and cached client directory data. For example, after caching client directory data using, for example, process 200, client device 101 may access or take action on secure target resource 102 using process 210.

At step 211, client device 101 may send a request and the cached client directory data to security server 104. As described above, the request may identify the target resources and actions which client device 101 requests to take. Similarly, as described above, the client directory data may indicate whether client device 101 may take these actions (e.g., through associated privileges, privileged group memberships, etc.).

At step 212, security server 104 may evaluate the request to determine whether client device 101 is authorized to access or take action on secure target resource 102. Security server 104 may make the evaluation based on the client directory data. For example, the client directory data may indicate the privileges associated with an identity associated with client device 101. If the privileges include the requested action in the request, security server 104 may determine that client device 101 may perform the action on secure target resource 102. Accordingly, at step 213, client device 101 may perform the corresponding actions on secure target resource 102. If the client directory data does not indicate that client device 101 is permitted to take the requested actions on secure target resource 102, the security server 104 may deny access to client device 101.

Figure 3:
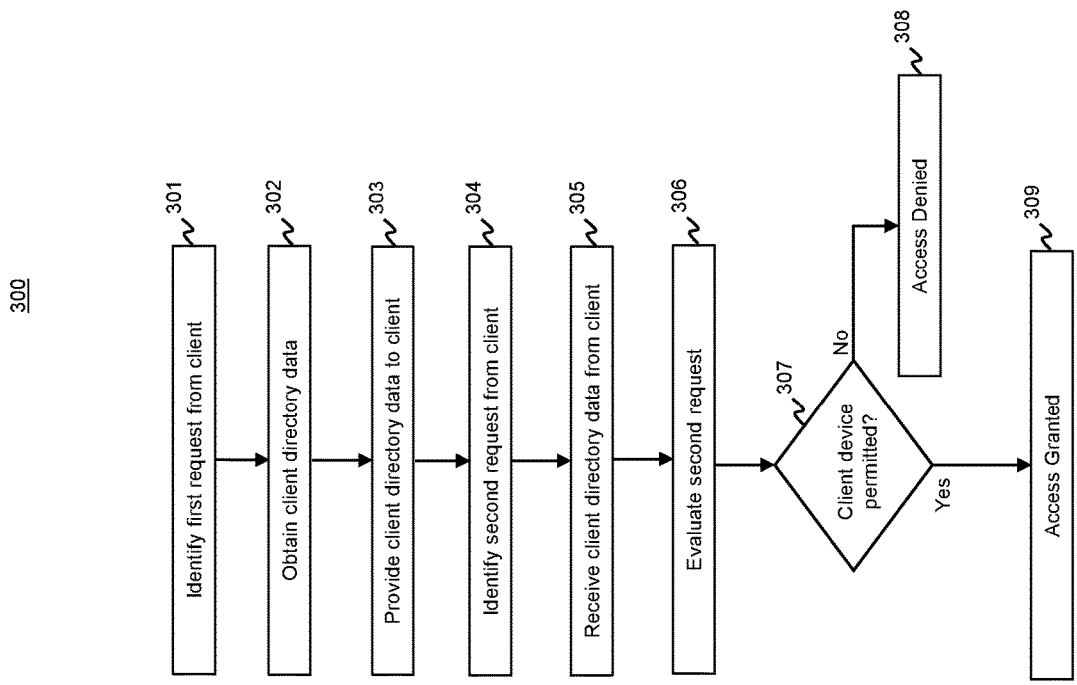
FIG. 3 is a flowchart depicting an exemplary process for managing distributed directory data in accordance with disclosed embodiments.

FIG. 3 is a flowchart depicting an exemplary process 300 for managing distributed directory data in accordance with disclosed embodiments. Process 300 may be executed by, for example, security server 104. Process 300 may correspond to parts of processes 200 and 210 shown in FIGS. 2A and 2B and, accordingly descriptions of the components and processes therein may apply to process 300 as well.

At step 301, process 300 may include identifying a first request from a client. For example, security server 104 may receive a request from client device 101 to access or take certain actions on secure target resource 102. The first request may be substantially as described above with respect to the request of FIG. 2A. For example, the first request may include a request for authentication. In some embodiments, the request may be a request for enrollment in a security service. For example, security server 104 may be associated with a third-party security service that manages security for an organization associated with secure target resource 102. The user associated with client device 101 may enroll in the service to gain future access to secure target resource 102 using client device 101.

In some embodiments, the access request may include information corresponding to the user and/or client device 101. For example, the request may include user credentials associated with the user. In some embodiments, the information may include biometric data or biological data (e.g., a fingerprint, facial scan, eye scan, voice recording, and the like). Security server 104 may use the information corresponding to the user and/or client device 101 to authenticate the user.

In other embodiments, such as when the request is an enrollment request, the request may include enrollment information about the user and/or client device 101 that may be used by security server 104 to enroll the user in the security service. For example, the request may include information identifying the user (e.g., name, username, email address, passwords, biometric or biological data, information identifying the client device, etc.). If the client is not already in enrolled with security service, security server 104 may use the enrollment information to enroll the client.

In some embodiments, the request may include an indication that the user is already authenticated. For example, client device 101 may include an authentication application (e.g., CyberArk Alero™) associated with the security service. The user may use the authentication application on client device 101 to authenticate with the security service such that credentials or other authentication information need not be provided directly to security server 104.

In some embodiments, after receiving the request, security server 104 may authenticate the user. For example, if the request includes user credentials, the security server 104 may use the credentials to authenticate the user. If the credentials are accurate, the security server 104 may then move to step 202.

In some embodiments, the request may also include information about one or more target resources 102 to which client device 101 requests access or to act upon. For example, the request may identify an organization's network or a database that the user of client device 101 wishes to access.

At step 302, process 300 may include obtaining client directory data. For example, security server 104 may obtain client directory data by receiving the client directory data from directory server 103. In some embodiments, security server 104 may identify the client or client device 101 in a request to directory server 103. Directory server 103 may then retrieve the corresponding directory data corresponding to the client and send the data to security server 104.

At step 303, process 300 may include providing client directory data to the client. For example, security server 104 may send the client directory data received from directory server 103 to client device 101. Client device 101 may be configured to cache the client directory data locally. Accordingly, security server 104 need not store a copy of the client directory data.

At step 304, process 300 may include identifying a second request from the client. The second request may be substantially as described above with respect to the request of FIG. 2B. As described above, the second request may identify a secure target resource 102 or resources and actions which client device 101 requests to take on the target resource 102. For example, security server 104 may receive a request from client device 101 identifying a network associated with an organization (secure target resource 102) and requesting to access the network. As another example, security server 104 may receive a request from client device 101 identifying a secure database and requesting to read data on the database.

At step 305, process 300 may include receiving client directory data from the client. For example, security server 104 may receive the cached client directory data from client device 101. As described above, the client directory data may indicate which actions client device 101 may take (e.g., through associated privileges, privileged group memberships, etc.) on certain target resources.

In some embodiments, steps 304 and 305 may occur in a single communication. For example, the client directory data may be included in the request of step 304. In some embodiments, the client directory data of step 305 may identify the target resource 102 and corresponding actions.

At step 306, process 300 may include evaluating the second request. For example, security server 104 may evaluate the second request to determine whether client device 101 is authorized to take the action identified by the second request. Security server 104 may make the evaluation based on the client directory data. For example, the client directory data may indicate the privileges associated with an identity associated with client device 101. If the actions permitted by the client's privileges include the requested action in the request, security server 104 may determine that client device 101 may perform the action on secure target resource 102. Accordingly, at step 307, process 300 may include determining if the client device is permitted to take the requested actions. If the client directory data does not indicate that client device 101 is permitted to take the requested actions on secure target resource 102, security server 104 may deny access to client device 101 at step 308. If client device is permitted, process 300 may proceed to step 309 and client device 101 may be granted access secure target resource 102 or be permitted to perform the corresponding actions on secure target resource 102.

Figure 4A:
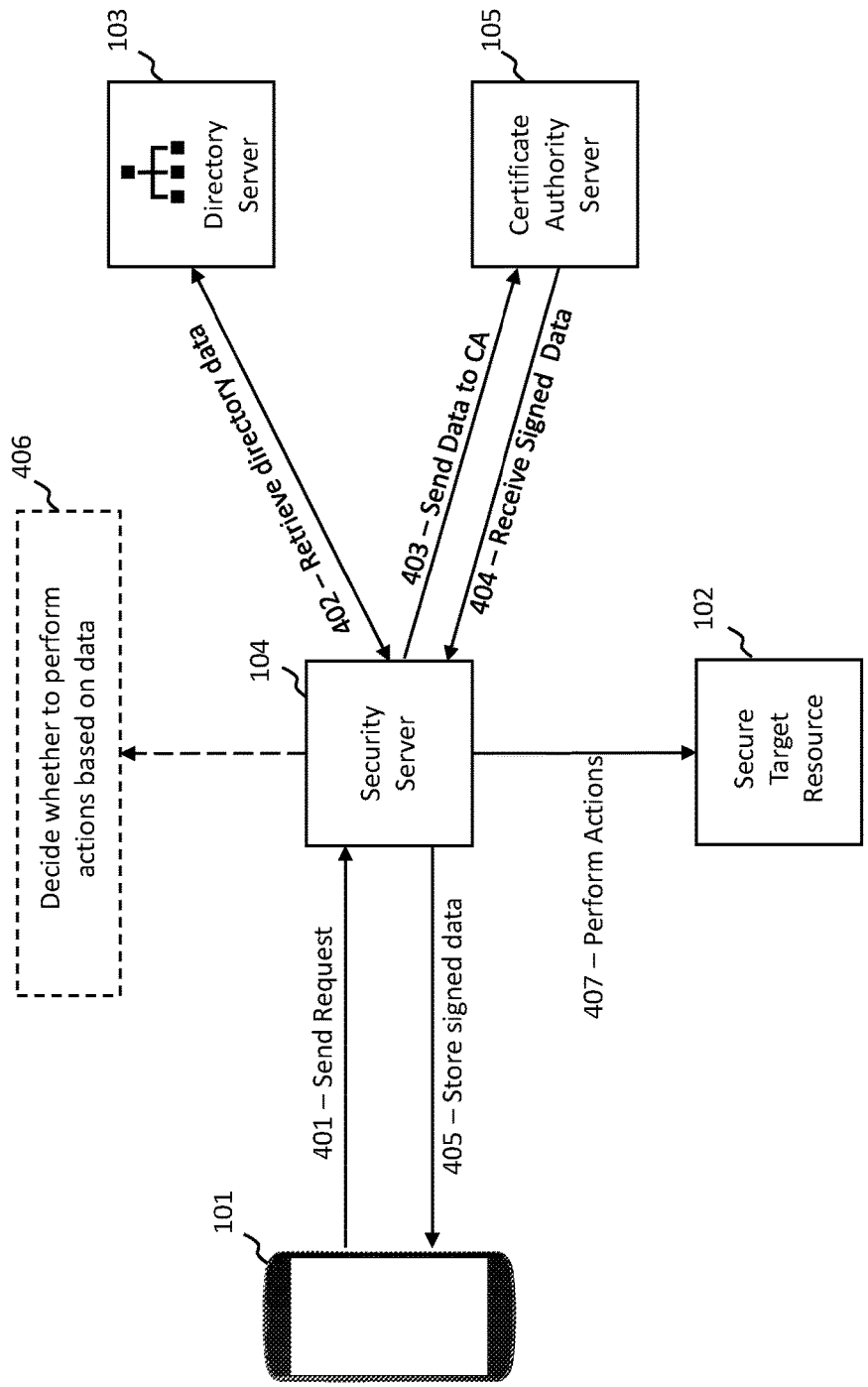
FIG. 4A is a block diagram of an exemplary process for managing distributed directory data using digital signatures in accordance with disclosed embodiments.

FIG. 4A is a block diagram of an exemplary process 400 for managing distributed directory data using digital signatures in accordance with disclosed embodiments. At step 401, process 400 may include sending a request to security server 104. Client device 101 may send a request to security server 104 requesting authentication and access to secure target resource 102. In some embodiments, the request may be a request for enrollment in a security service. For example, security server 104 may be associated with a third-party security service that manages security for an organization associated with secure target resource 102. The user associated with client device 101 may enroll in the service to gain future access to secure target resource 102 using client device 101.

In some embodiments, the access request may include information corresponding to the user and/or client device 101. For example, the request may include user credentials associated with the user. In some embodiments, the information may include biometric data or biological data (e.g., a fingerprint, facial scan, eye scan, voice recording, and the like). Security server 104 may use the information to authenticate the user.

In other embodiments, such as when the request is an enrollment request, the request may include enrollment information about the user and/or client device 101 that may be used by security server 104 to enroll the user in the security service. For example, the request may include information identifying the user (e.g., name, username, email address, passwords, biometric or biological data, information identifying the client device, etc.). If the client is not already in enrolled with a security service, security server 104 may use the enrollment information to enroll the client.

In some embodiments, the request may include an indication that the user is authenticated. For example, client device 101 may include an authentication application (e.g., CyberArk Alero™) associated with the security service. The user may use the authentication application on client device 101 to authenticate with the security service such that credentials or other authentication information need not be provided directly to security server 104. For example, the authentication application may request a biometric or other credential to the application, which the application may use to authenticate the user. In some embodiments, a user may authenticate with the security service using other techniques or protocols. For example, a user may use a web browser on client device 101 to authenticate according to FIDO2 specifications. In this case, the user may authenticate using the FIDO2 protocols on the same device being used to access secure target resource 102, or using an external secondary device. Like the authentication application, the security service may request a biometric attribute, security key, or other credential used to securely authenticate the user.

In some embodiments, after receiving the request, security server 104 may authenticate the user. For example, if the request includes user credentials, the security server 104 may use the credentials to authenticate the user. If the credentials are accurate, the security server 104 may then move to step 402.

In some embodiments, the request may also include information about one or more target resources 102 to which client device 101 requests to access or to act upon. For example, the request may identify an organization's network or a database that the user of client device 101 wishes to access.

At step 402, security server 104 may retrieve directory data associated with the client from directory server 103. Client directory data may include privileges data, privileged membership data, password data, personal data, etc. For example, client directory data may indicate that the client is a member of a certain group of identities with enhanced privileges, e.g., network administrators. Accordingly, the client directory data may indicate what actions the client is permitted to take on secure target resource 102. In some embodiments, obtaining the client directory data may be performed on a least-privilege basis.

In some embodiments, client directory data may include an expiration attribute. An expiration attribute may indicate a certain number of uses or a certain time after which the client directory data may expire and no longer be valid. For example, an expiration attribute may indicate that the client directory data is valid for one day or one week. After that period, the client directory data may no longer be valid, and accordingly, new valid client directory data may need to be obtained from the directory server 103.

In some embodiments, security server 104 may update a separate directory resource based on the obtained client directory data. For example, security server 104 or a security service associated with security server 104 may maintain its own separate directory resource. In some embodiments, a separate directory resource may be associated with secure target resource 102 or directory server 103. The separate directory resource may manage temporary or just-in-time accounts corresponding to clients. For example, when security server 104 receives the client directory data, it may initiate generation of a temporary account corresponding to the client. Security server 104 may use this temporary account to grant the client access to secure target resource 102. For example, it may grant the temporary account the privileges associated with the client as indicated by the client directory data. When the client's session ends, security server 104 may remove the associated temporary account.

At step 403, security server 104 may send the client directory data to certificate authority server 105. Certificate authority server 105 may be associated with a third-party certificate authority, as described above with respect to FIG. 1. Certificate authority server 105 may receive the client directory data and apply a digital signature to the data. Applying a digital signature to the client directory data may facilitate later verification of the data through verification of the signature.

At step 404, certificate authority server 105 may send a signed version of the client directory data back to security server 104. In some embodiments, certificate authority server may also send a public key, a hashing algorithm corresponding to the digital signature, or other information needed to validate the digital signature to security server 104. At step 405, security server 104 may send the signed client directory data back to client device 101 for caching. Client device 101 may cache the signed client directory data locally. In some embodiments, security server 104 may send the signed client directory to client device 101 on a periodic basis. For example, security server 104 may routinely send the signed client directory data according to a predetermined schedule or with a predetermined time interval between transmissions.

At step 406, security server 104 may evaluate the request to determine whether client device 101 is authorized to access or take action on secure target resource 102. Security server 104 may make the evaluation based on the client directory data. For example, the client directory data may indicate the privileges associated with an identity associated with client device 101. If the privileges include the requested action in the request, security server 104 may determine that client device 101 may perform the action on secure target resource 102. Accordingly, at step 407, client device 101 may perform the corresponding actions on secure target resource 102. If the client directory data does not indicate that client device 101 is permitted to take the requested actions on secure target resource 102, the security server 104 may deny access to client device 101.

Figure 4B:
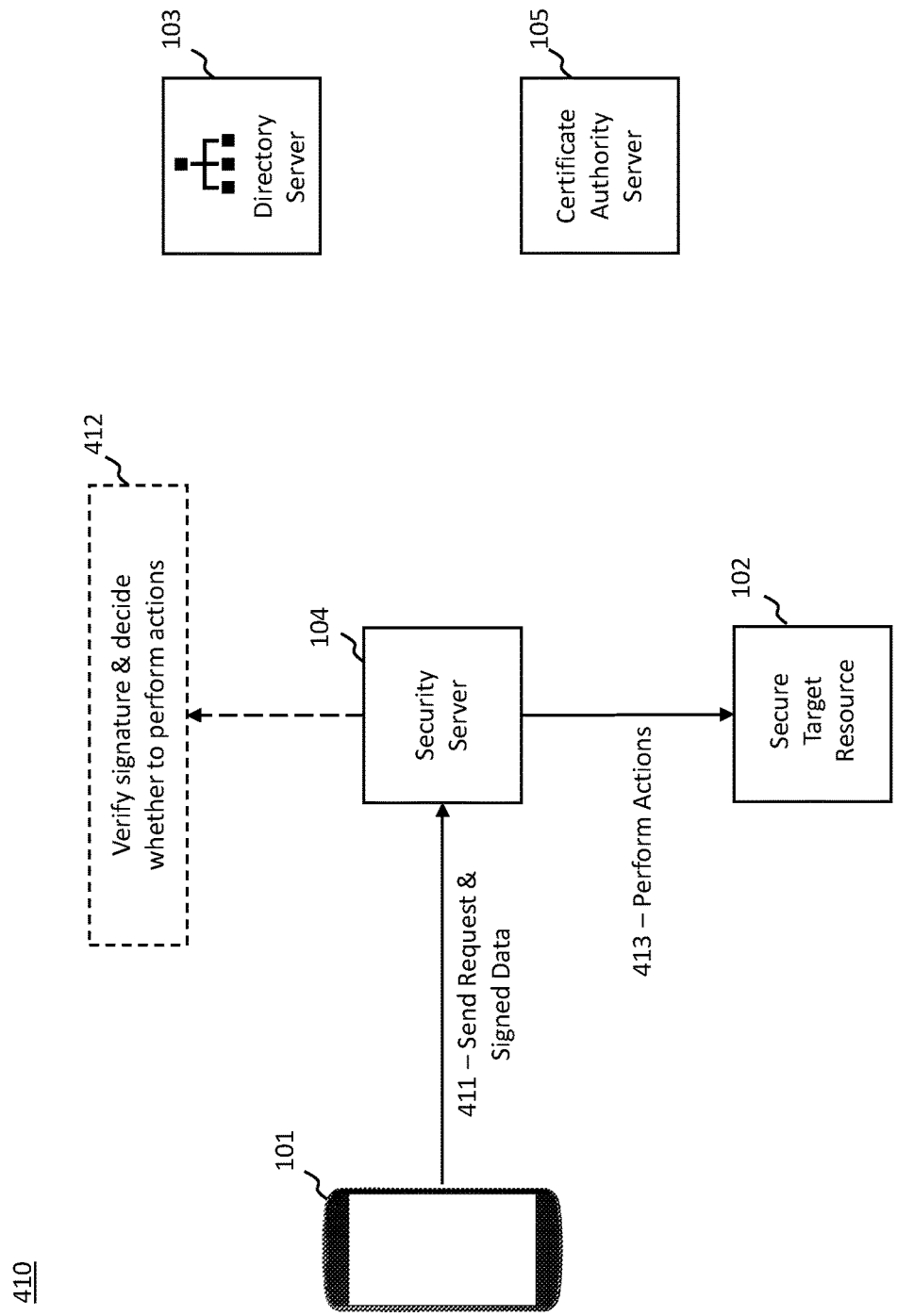
FIG. 4B is a block diagram of an exemplary process for managing distributed directory data using digital signatures in accordance with disclosed embodiments.

FIG. 4B is a block diagram of an exemplary process 410 for managing distributed directory data using digital signatures in accordance with disclosed embodiments. Process 410 may be used for subsequent requests, after an initial request, in response to which client device 101 has received and cached signed client directory data. For example, after caching signed client directory data using, for example, process 400, client device 101 may access or take action on secure target resource 102 using process 410.

At step 411, client device 101 may send a request and the cached signed client directory data to security server 104. As described above, the request may identify the target resources and actions which client device 101 requests to take. Similarly, as described above, the client directory data may indicate whether client device 101 may take these actions (e.g., through associated privileges, privileged group memberships, etc.).

At step 412, security server 104 may verify the digital signature of the signed client directory data. For example, security server 104 may verify the digital signature using a public key received from certificate authority server 105. In some embodiments, security server 104 may send the signed data back to certificate authority server 105 for signature verification. If the signature is successfully verified, certificate authority server 105 may send an indication of successful verification to security server 104. Upon successful verification of the signature, security server 104 may evaluate the request to determine whether client device 101 is authorized to access or take action on secure target resource 102. If the signature is not successfully verified by security server 104 or certificate authority server 105, security server 104 may deny client device 101 access to secure target resource 102.

Security server 104 may make the evaluation based on the client directory data. For example, the client directory data may indicate the privileges associated with an identity associated with client device 101. If the privileges include the requested action in the request, security server 104 may determine that client device 101 may perform the action on secure target resource 102. Accordingly, at step 413, client device 101 may perform the corresponding actions on secure target resource 102. If the client directory data does not indicate that client device 101 is permitted to take the requested actions on secure target resource 102, the security server may deny access to client device 101.

Figure 5:
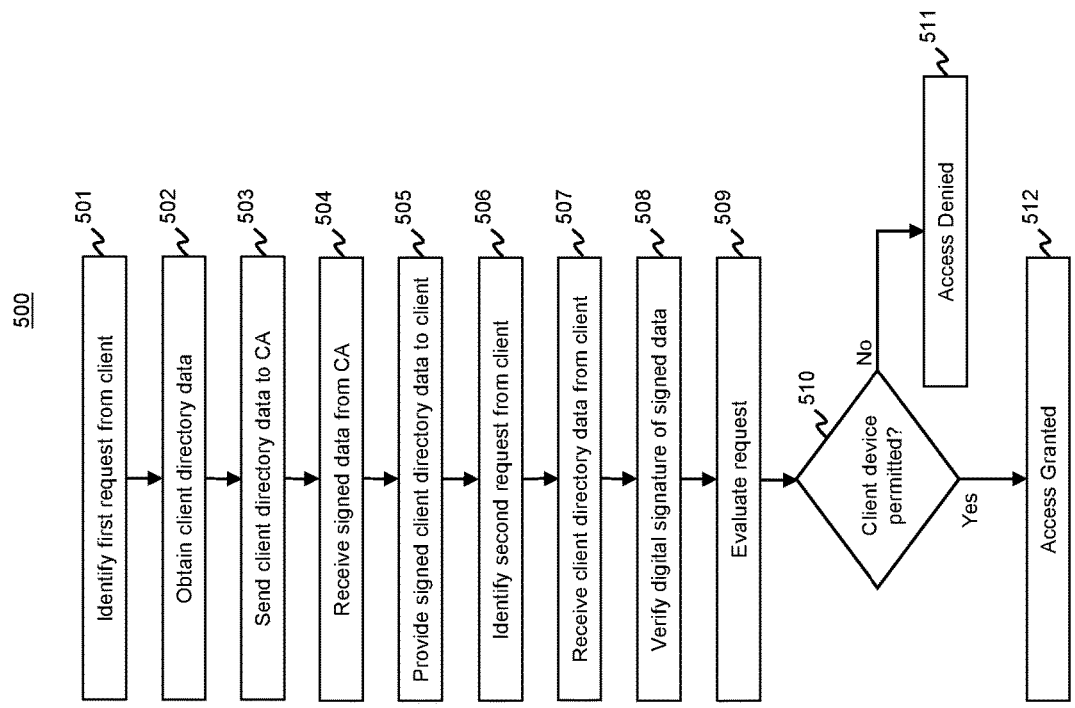
FIG. 5 is a flowchart depicting an exemplary process for managing distributed directory data using digital signatures in accordance with disclosed embodiments.

FIG. 5 is a flowchart depicting an exemplary process 500 for managing distributed directory data using digital signatures in accordance with disclosed embodiments. Process 500 may be executed by, for example, security server 104. Process 500 may correspond to parts of processes 200, 210, 300, 400, and 410 shown in FIGS. 2A, 2B, 3, 4A, and 4B and, accordingly descriptions of the components and processes therein may apply to process 500 as well.

At step 501, process 500 may include identifying a first request from a client. For example, security server 104 may receive a request from client device 101 to access or take certain actions on secure target resource 102. The first request may be substantially as described above with respect to the requests of FIG. 4A. For example, the first request may include a request for authentication. In some embodiments, the request may be a request for enrollment in a security service. For example, security server 104 may be associated with a third-party security service that manages security for an organization associated with secure target resource 102. The user associated with client device 101 may enroll in the service to gain future access to secure target resource 102 using client device 101.

In some embodiments, the access request may include information corresponding to the user and/or client device 101. For example, the request may include user credentials associated with the user. In some embodiments, the information may include biometric data or biological data (e.g., a fingerprint, facial scan, eye scan, voice recording, and the like). Security server 104 may use the information corresponding to the user and/or client device 101 to authenticate the user.

In other embodiments, such as when the request is an enrollment request, the request may include enrollment information about the user and/or client device 101 that may be used by security server 104 to enroll the user in the security service. For example, the request may include information identifying the user (e.g., name, username, email address, passwords, biometric or biological data, information identifying the client device, etc.). If the client is not already in enrolled with a security service, security server 104 may use the enrollment information to enroll the client.

In some embodiments, the request may include an indication that the user is already authenticated. For example, client device 101 may include an authentication application (e.g., CyberArk Alero™) associated with the security service. The user may use the authentication application on client device 101 to authenticate with the security service such that credentials or other authentication information need not be provided directly to security server 104.

In some embodiments, after receiving the request, security server 104 may authenticate the user. For example, if the request includes user credentials, the security server 104 may use the credentials to authenticate the user. If the credentials are accurate, the security server 104 may then move to step 502.

In some embodiments, the request may also include information about one or more target resources 102 to which client device 101 requests to access or to act upon. For example, the request may identify an organization's network or a database that the user of client device 101 wishes to access.

At step 502, process 500 may include obtaining client directory data. For example, security server 104 may obtain client directory data by receiving the client directory data from directory server 103. In some embodiments, security server 104 may identify the client or client device 101 in a request to directory server 103. Directory server 103 may then retrieve the corresponding directory data corresponding to the client and send the data to security server 104.

At step 503, process 500 may include sending the client directory data to a certificate authority. For example, security server 104 may send the obtained client directory data to a certificate authority server 105, as described above with respect to FIG. 1. Certificate authority server 105 may be associated with a third-party certificate authority. Certificate authority server 105 may be configured to receive the client directory data and apply a digital signature to the data. The digital signature may facilitate later verification of the client directory data through verification of the signature.

At step 504, process 500 may include receiving signed client directory data. For example, certificate authority server 105 may sign the client directory sent by security server 104 at step 503. The certificate authority server 105 may then digitally sign the client directory data and send it to security server 104. In some embodiments, the certificate authority server 105 may also send a public key, a hashing algorithm corresponding to the digital signature, or other information needed to validate the digital signature to security server 104.

At step 505, process 500 may include providing signed client directory data to the client. For example, security server 104 may send the signed client directory data received from directory server 103 to client device 101. Client device 101 may be configured to cache the signed client directory data locally. Accordingly, security server 104 need not store a copy of the signed client directory data.

At step 506, process 500 may include identifying a second request from the client. The second request may be substantially as described above with respect to the request of FIG. 4B. As described above, the second request may identify a secure target resource 102 or resources and actions which client device 101 requests to take on the target resource 102. For example, security server 104 may receive a request from client device 101 identifying a network associated with an organization (secure target resource 102) and requesting to access the network. As another example, security server 104 may receive a request from client device 101 identifying a secure database and requesting to read data on the database.

At step 507, process 500 may include receiving client directory data from the client. For example, security server 104 may receive the cached signed client directory data from client device 101. As described above, the client directory data may indicate which actions client device 101 may take (e.g., through associated privileges, privileged group memberships, etc.) on certain target resources.

In some embodiments, steps 506 and 507 may occur in a single communication. For example, the client directory data may be included in the second request of step 506. In some embodiments, the signed client directory data of step 507 may identify the target resource 102 and corresponding actions.

At step 508, process 500 may include verifying the digital signature of the signed client directory data. For example, security server 104 may verify the digital signature of the signed client directory data using a public key received from certificate authority server 105. In some embodiments, security server 104 may send the signed client directory data back to certificate authority server 105 for signature verification. If the signature is successfully verified, certificate authority server 105 may send an indication of successful verification to security server 104. Upon successful verification of the signature, security server 104 may evaluate the request to determine whether client device 101 is authorized to access or take action on secure target resource 102. If the signature is not successfully verified by security server 104 or certificate authority server 105, security server 104 may deny client device 101 access to secure target resource 102.

At step 509, process 500 may include evaluating the second request. In some embodiments, step 509 may occur conditional on the successful verification of the digital signature (e.g., step 508). For example, security server 104 may evaluate the second request to determine whether client device 101 is authorized to take the action identified by the second request. Security server 104 may make the evaluation based on the client directory data. For example, the client directory data may indicate the privileges associated with an identity associated with client device 101. If the actions permitted by the client's privileges include the requested action in the request, security server 104 may determine that client device 101 may perform the action on secure target resource 102. Accordingly, at step 510, process 500 may include determining if the client device is permitted to take the requested actions. If the client directory data does not indicate that client device 101 is permitted to take the requested actions on secure target resource 102, security server 104 may deny access to client device 101 at step 511. If client device 101 is permitted, process 500 may proceed to step 512 and client device 101 may be granted access secure target resource 102 or be permitted to perform the corresponding actions on secure target resource 102.

Figure 6A:
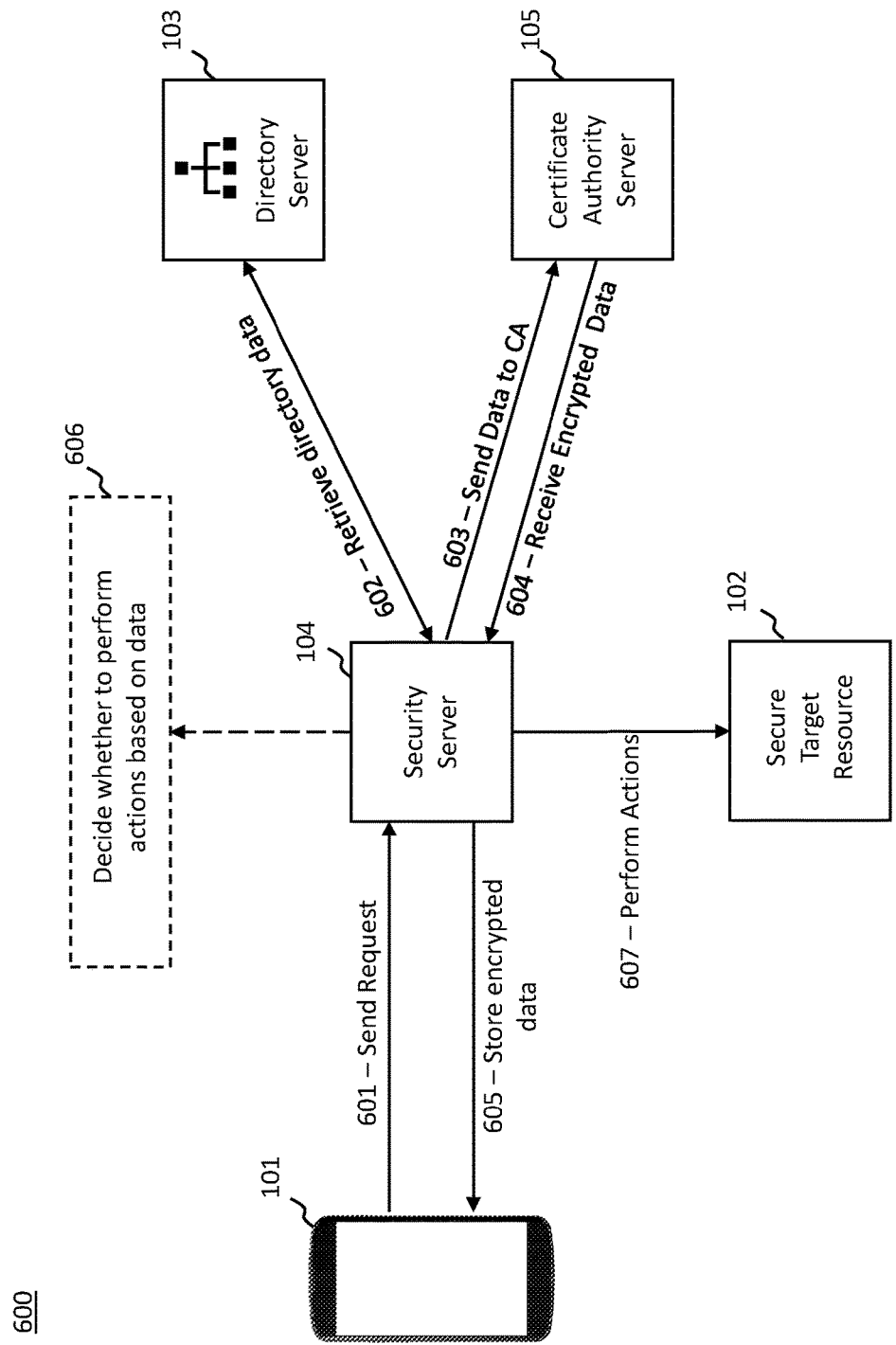
FIG. 6A is a block diagram of an exemplary process for managing distributed directory data using encryption in accordance with disclosed embodiments.

FIG. 6A is a block diagram of an exemplary process 600 for managing distributed directory data using encryption in accordance with disclosed embodiments. At step 601, process 600 may include sending a request to security server 104. Client device 101 may send a request to security server 104 requesting authentication and access to secure target resource 102. In some embodiments, the request may be a request for enrollment in a security service. For example, security server 104 may be associated with a third-party security service that manages security for an organization associated with secure target resource 102. The user associated with client device 101 may enroll in the service to gain future access to secure target resource 102 using client device 101.

In some embodiments, the access request may include information corresponding to the user and/or client device 101. For example, the request may include user credentials associated with the user. In some embodiments, the information may include biometric data or biological data (e.g., a fingerprint, facial scan, eye scan, voice recording, and the like). Security server 104 may use the information to authenticate the user.

In other embodiments, such as when the request is an enrollment request, the request may include enrollment information about the user and/or client device 101 that may be used by security server 104 to enroll the user in the security service. For example, the request may include information identifying the user (e.g., name, username, email address, passwords, biometric or biological data, information identifying the client device, etc.). If the client is not already in enrolled with security service, security server 104 may use the enrollment information to enroll the client.

In some embodiments, the request may include an indication that the user is authenticated. For example, client device 101 may include an authentication application (e.g., CyberArk Alero™) associated with the security service. The user may use the authentication application on client device 101 to authenticate with the security service such that credentials or other authentication information need not be provided directly to security server 104. For example, the authentication application may request a biometric or other credential to the application, which the application may use to authenticate the user. In some embodiments, a user may authenticate with the security service using other techniques or protocols. For example, a user may use a web browser on client device 101 to authenticate according to FIDO2 specifications. In this case, the user may authenticate using the FIDO2 protocols on the same device being used to access secure target resource 102, or using an external secondary device. Like the authentication application, the security service may request a biometric attribute, security key, or other credential used to securely authenticate the user.

In some embodiments, after receiving the request, security server 104 may authenticate the user. For example, if the request includes user credentials, the security server may use the credentials to authenticate the user. If the credentials are accurate, the security server may then move to step 602.

In some embodiments, the request may also include information about one or more target resources 102 to which client device 101 requests to access or to act upon. For example, the request may identify an organization's network or a database that the user of client device 101 wishes to access.

At step 602, security server 104 may retrieve directory data associated with the client from directory server 103. Client directory data may include privileges data, privileged membership data, password data, personal data, etc. For example, client directory data may indicate that the client is a member of a certain group of identities with enhanced privileges, e.g., network administrators. Accordingly, the client directory data may indicate what actions the client is permitted to take on secure target resource 102. In some embodiments, obtaining the client directory data may be performed on a least-privilege basis.

In some embodiments, client directory data may include an expiration attribute. An expiration attribute may indicate a certain number of uses or a certain time after which the client directory data may expire and no longer be valid. For example, an expiration attribute may indicate that the client directory data is valid for one day or one week. After that period, the client directory data may no longer be valid, and accordingly, new valid client directory data may need to be obtained from the directory server 103.

In some embodiments, security server 104 may update a separate directory resource based on the obtained client directory data. For example, security server 104 or a security service associated with security server 104 may maintain its own separate directory resource. In some embodiments, a separate directory resource may be associated with secure target resource 102 or directory server 103. The separate directory resource may manage temporary or just-in-time accounts corresponding to clients. For example, when security server 104 receives the client directory data, it may initiate generation of a temporary account corresponding to the client. Security server 104 may use this temporary account to grant the client access to secure target resource 102. For example, it may grant the temporary account the privileges associated with the client as indicated by the client directory data. When the client's session ends, security server 104 may remove the associated temporary account.

At step 603, security server 104 may send the client directory data to certificate authority server 105. Certificate authority server 105 may be associated with a third-party certificate authority or security service, as described above with respect to FIG. 1. Certificate authority server 105 may receive the client directory data and encrypt the data. Encryption may be performed using a variety of encryption methods. In some embodiments, certificate authority server 105 may employ symmetric encryption (e.g., Blowfish, AES, RC4, DES, or others) using a secret key. The secret may only be known by certificate authority server 105. In some embodiments, certificate authority server 105 may use an asymmetric or public-private key encryption method (e.g., Diffie-Hellman, RSA, DSA, or others) using a public key and private key. For example, certificate authority server 105 may encrypt the client directory data using private key. The private key may correspond to a public key, which may be used for decryption. The certificate authority server 105 may send the public key to security server 104.

At step 604, certificate authority server 105 may send the encrypted client directory data back to security server 104. In some embodiments, for example when certificate authority server 105 uses an asymmetric encryption algorithm, certificate authority server may also send a public key for decryption to security server 104. The public key may be used later by security server 104 to decrypt the encrypted client directory data. At step 605, security server 104 may send the encrypted directory data back to client device 101 for caching. In some embodiments, security server 104 may send the encrypted client directory to client device 101 on a periodic basis. For example, security server 104 may routinely send encrypted client directory data according to a predetermined schedule or with a predetermined time interval between transmissions.

Client device 101 may cache the encrypted client directory data locally. Because the cached client directory data is encrypted, client device 101 may not be able to actually read the data. In other words, client device 101 may lack the cryptographic key required to decrypt the data. Accordingly, encryption may add even additional security to the system because even if client device 101 were to be compromised, an attack would still not gain access to the client directory data.

At step 606, security server 104 may evaluate the request to determine whether client device 101 is authorized to access or take action on secure target resource 102. Security server 104 may make the evaluation based on the client directory data. In some embodiments, security server 104 may decrypt the encrypted client directory data before making the evaluation. For example, the client directory data may indicate the privileges associated with an identity associated with client device 101. If the privileges include the requested action in the request, security server 104 may determine that client device 101 may perform the action on secure target resource 102. Accordingly, at step 607, client device 101 may perform the corresponding actions on secure target resource 102. If the client directory data does not indicate that client device 101 is permitted to take the requested actions on secure target resource 102, the security server 104 may deny access to client device 101.

Figure 6B:
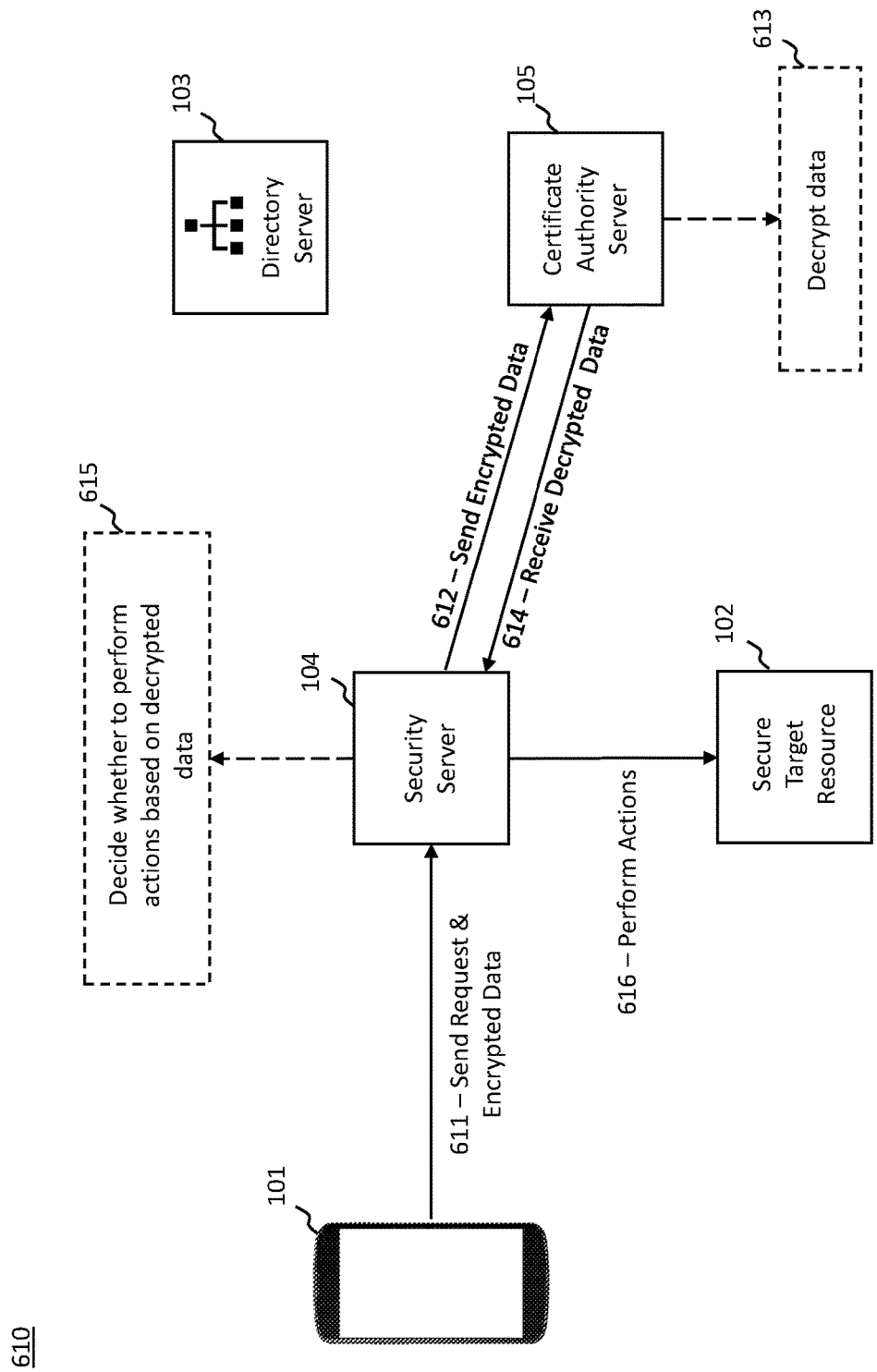
FIG. 6B is a block diagram of an exemplary process for managing distributed directory data using encryption in accordance with disclosed embodiments.

FIG. 6B is a block diagram of an exemplary process 610 for managing distributed directory data using encryption in accordance with disclosed embodiments. Process 610 may be used for subsequent requests, after an initial request, in response to which client device 101 has received and cached encrypted client directory data. For example, after caching encrypted client directory data using, for example, process 600, client device 101 may access or take action on secure target resource 102 using process 610.

At step 611, client device 101 may send a request and the cached encrypted client directory data to security server 104. As described above, the request may identify the target resources and actions which client device 101 requests to take. Similarly, as described above, the client directory data may indicate whether client device 101 may take these actions (e.g., through associated privileges, privileged group memberships, etc.).

At step 612, security server 104 may send the encrypted client directory data to certificate authority server 105. Upon receiving the encrypted client directory data, certificate authority server 105 may decrypt the data in operation 613, for example, using a stored encryption key. At step 614, certificate authority server 105 may then send the decrypted client directory data back to security server 104.

In some embodiments, security server 104 may decrypt the data itself, rather than send the data to certificate authority server 105 for decryption. For example, security server 104 may store a public cryptographic key corresponding to the key (e.g., private cryptographic key) used to encrypt the data. Security server 104 may use the public cryptographic key to decrypt the data. In some embodiments, security server 104 may receive a public cryptographic key from certificate authority server 105.

Upon successful decryption of the data, either by security server 104 or certificate authority server 105, security server 104 may evaluate the request to determine whether client device 101 is authorized to access or take action on secure target resource 102, in operation 615. Security server 104 may make the evaluation based on the client directory data. For example, the client directory data may indicate the privileges associated with an identity associated with client device 101. If the privileges include the requested action in the request, security server 104 may determine that client device 101 may perform the action on secure target resource 102. Accordingly, at step 616, client device 101 may perform the corresponding actions on secure target resource 102. If the client directory data does not indicate that client device 101 is permitted to take the requested actions on secure target resource 102, the security server 104 may deny access to client device 101.

Figure 7:
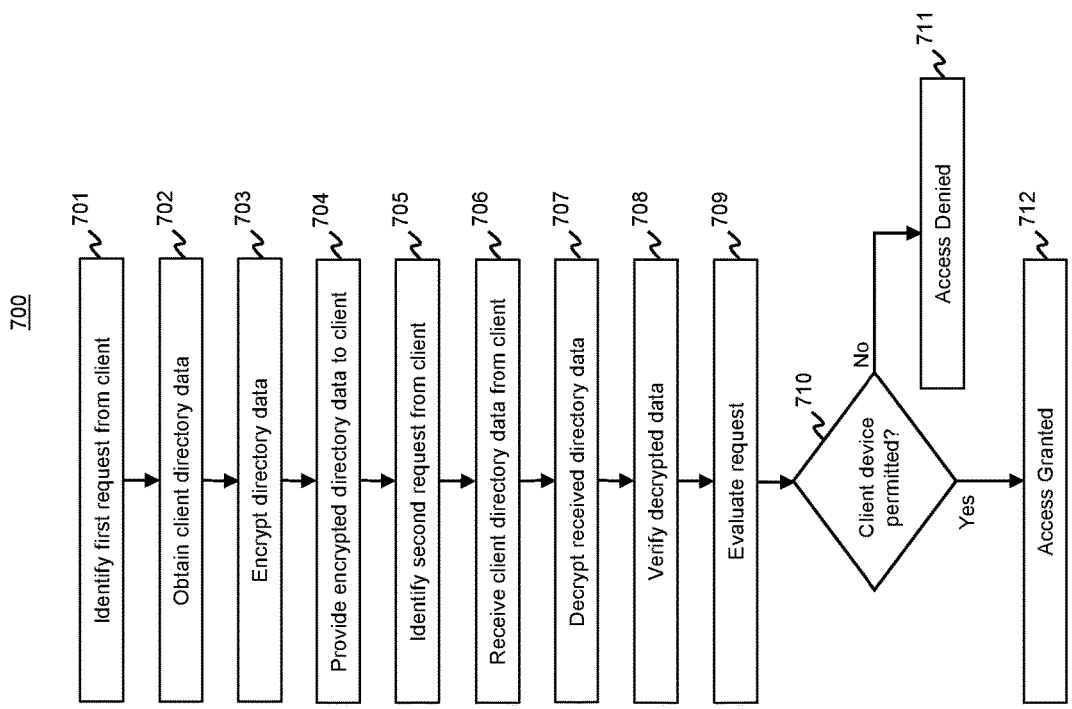
FIG. 7 is a flowchart depicting an exemplary process for managing distributed directory data using encryption in accordance with disclosed embodiments.

FIG. 7 is a flowchart depicting an exemplary process 700 for managing distributed directory data using encryption in accordance with disclosed embodiments. Process 700 may be executed by, for example, security server 104. Process 700 may correspond to parts of processes illustrated in FIGS. 2A-6B, and, accordingly, descriptions of the components and processes therein may apply to process 700 as well.

At step 701, process 700 may include identifying a first request from a client. For example, security server 104 may receive a request from client device 101 to access or take certain actions on secure target resource 102. The first request may be substantially as described above with respect to the requests of FIG. 6A. For example, the first request may include a request for authentication. In some embodiments, the request may be a request for enrollment in a security service. For example, security server 104 may be associated with a third-party security service that manages security for an organization associated with secure target resource 102. The user associated with client device 101 may enroll in the service to gain future access to secure target resource 102 using client device 101.

In some embodiments, the access request may include information corresponding to the user and/or client device 101. For example, the request may include user credentials associated with the user. In some embodiments, the information may include biometric data or biological data (e.g., a fingerprint, facial scan, eye scan, voice recording, and the like). Security server 104 may use the information corresponding to the user and/or client device 101 to authenticate the user.

In other embodiments, such as when the request is an enrollment request, the request may include enrollment information about the user and/or client device 101 that may be used by security server 104 to enroll the user in the security service. For example, the request may include information identifying the user (e.g., name, username, email address, passwords, biometric or biological data, information identifying the client device, etc.). If the client is not already in enrolled with security service, security server 104 may use the enrollment information to enroll the client.

In some embodiments, the request may include an indication that the user is already authenticated. For example, client device 101 may include an authentication application (e.g., CyberArk Alero™) associated with the security service. The user may use the authentication application on client device 101 to authenticate with the security service such that credentials or other authentication information need not be provided directly to security server 104.

In some embodiments, after receiving the request, security server 104 may authenticate the user. For example, if the request includes user credentials, the security server 104 may use the credentials to authenticate the user. If the credentials are accurate, the security server may then move to step 702.

In some embodiments, the request may also include information about one or more target resources 102 to which client device 101 requests to access or to act upon. For example, the request may identify an organization's network or a database that the user of client device 101 wishes to access.

At step 702, process 700 may include obtaining client directory data. For example, security server 104 may obtain client directory data by receiving the client directory data from directory server 103. In some embodiments, security server 104 may identify the client or client device 101 in a request to directory server 103. Directory server 103 may then retrieve the corresponding directory data corresponding to the client and send the data to security server 104.

At step 703, process 700 may include encrypting the client directory data. As described above with respect to FIG. 6A, the encryption may be completed using one or more of a variety of encryption algorithms. For example, an encryption algorithm may be a symmetric algorithm using a single key (e.g., Blowfish, AES, RC4, DES, or others) or asymmetric algorithm using multiple keys (e.g., Diffie-Hellman, RSA, DSA, or others). Symmetric algorithms may be desirable when the same device that encrypts the data will also decrypt the data (e.g., if security server 104 both encrypts and decrypts the data). Asymmetric algorithms may be desirable when one device encrypts the data and a second device decrypts the data (e.g., if certificate authority server 105 encrypts the data but security server 104 decrypts the data).

In some embodiments, encrypting the client directory data may include sending the client directory data to a certificate authority or similar security service for performing the encryption. For example, security server 104 may send the obtained client directory data to certificate authority server 105, as described above with respect to FIGS. 1 and 6A. Certificate authority server 105 may be associated with a third-party certificate authority or other security or encryption service. Certificate authority server 105 may be configured to receive the client directory data and encrypt the data. After encrypting the data, certificate authority server 105 may send the encrypted data back to security server 104. In some embodiments, certificate authority server 105 may also send a cryptographic key to security server 104. For example, if certificate authority server 105 encrypts the data with an asymmetric algorithm using a private key, certificate authority server 105 may send the corresponding public key to security server 104. Security server 104 may store the public key and later use it to decrypt the encrypted client directory data. In some embodiments, security server 104 may be associated with multiple client devices 101 that are associated with different clients. In some cases, certificate authority server 105 may use different encryption keys or algorithms for different client directory data. Accordingly, security server 104 may receive and store multiple cryptographic keys, which may be used to decrypt different sets of client directory data. Of course, in some embodiments, security server 104 may not receive a cryptographic key from certificate authority server 105. For example, certificate authority server 105 may be configured to apply a symmetric encryption algorithm to encrypt the client directory data and to not send the cryptographic key to another device.

In some embodiments, encrypting the client directory data may include encrypting the obtained data locally. For example, security server 104 may encrypt the client directory data.

At step 704, process 700 may include providing encrypted client directory data to the client. For example, security server 104 may send the encrypted signed client directory data to client device 101. Client device 101 may be configured to cache the encrypted client directory data locally. Accordingly, security server 104 need not store a copy of the encrypted client directory data.

At step 705, process 700 may include identifying a second request from the client. The second request may be substantially as described above with respect to the request of FIG. 6B. As described above, the second request may identify a secure target resource 102 or resources and actions which client device 101 requests to take on the target resource 102. For example, security server 104 may receive a request from client device 101 identifying a network associated with an organization (secure target resource 102) and requesting to access the network. As another example, security server 104 may receive a request from client device 101 identifying a secure database and requesting to read data on the database.

At step 706, process 700 may include receiving client directory data from the client. For example, security server 104 may receive the cached encrypted client directory data from client device 101. As described above, the client directory data may indicate which actions client device 101 may take (e.g., through associated privileges, privileged group memberships, etc.) on certain target resources 102.

In some embodiments, steps 705 and 706 may occur in a single communication. For example, the client directory data may be included in the second request of step 705. In some embodiments, the encrypted client directory data of step 706 may identify the target resource 102 and corresponding actions.

At step 707, process 700 may include decrypting the encrypted client directory data. For example, security server 104 may decrypt the data using the cryptographic key security server 104 used to initially encrypt the data. As another example, security server 104 may decrypt the encrypted client directory data using a public key received from certificate authority server 105. In some embodiments, security server 104 may send the encrypted client directory data back to certificate authority server 105 for decryption. Certificate authority server 105 may be configured to decrypt the encrypted client directory data and send the decrypted data back to security server 104.

At step 708, process 700 may include verifying the decrypted data. For example, security server 104 may verify that the decrypted data corresponds to client device 101.

At step 709, process 700 may include evaluating the second request. In some embodiments, step 709 may occur conditional on the successful verification of the decrypted data (e.g., step 708). For example, security server 104 may evaluate the second request to determine whether client device 101 is authorized to take the action identified by the second request. Security server 104 may make the evaluation based on the decrypted client directory data. For example, the decrypted client directory data may indicate the privileges associated with an identity associated with client device 101. If the actions permitted by the client's privileges include the requested action in the request, security server 104 may determine that client device 101 may perform the action on secure target resource 102. Accordingly, at step 710, process 700 may include determining if the client device is permitted to take the requested actions. If the decrypted client directory data does not indicate that client device 101 is permitted to take the requested actions on secure target resource 102, security server 104 may deny access to client device 101 at step 711. If client device is permitted, process 700 may proceed to step 712 and client device 101 may be granted access secure target resource 102 or be permitted to perform the corresponding actions on secure target resource 102.

A potential use case of the disclosed embodiments is described below. It is understood that this use case is provided by way of example only and is not limiting of the present disclosure.

One potential implementation may be to implement a distributed directory cache to a large company's computing system. The company's system (e.g., secure resource 140) may include a variety of different resources to which users may be granted access. The company may implement a directory service using a directory server. The directory server may store directory data corresponding to each of the users, services, etc. associated with the system. The company also may use a security service to manage access to their system.

A user may use a mobile phone (client device 101) to gain access to the company's system and secure target resource 102. The user's mobile phone may have an application associated with the security service that the user may use for authentication. The user may authenticate using the app using a fingerprint scan. The security service application may then communicate with a security server 104 associated with the security service that manages access to the company's system. The application may send a request for access to a certain secure target resource 102 within the company's system (e.g., a certain cloud computing environment).

Upon receiving the user's access request, security server 102 may retrieve client directory data associated with the user from the directory service server 103. The client directory data may indicate the privileges of the user or privileged group membership of the user. In this case, the client directory data may indicate that the user is a member of the "General" membership group, which may indicate that the user should be granted a predetermined level of permissions granted to most users of the system. In contrast, there may be an "Admin" membership group, the members of which may be granted a higher level of privileges.

Upon retrieving the user's client directory data, security server 104 may encrypt the data and then send it back to the user's mobile phone for caching. Encrypting the data may provide additional security to the system should the mobile device be compromised by an attacker. After receiving the encrypted data, the mobile phone may store the encrypted data for use with future access requests. When the user requests access to another specific secure target resource 102, such as a virtual machine within the company's system, the user's mobile phone may send the encrypted data back to security server 104.

Security server 104 may then decrypt the data and evaluate the data to determine if the user is permitted to access the virtual machine. If the data indicates that the user should be granted the permission to access the virtual machine, security server 104 may grant the user appropriate access.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for managing distributed directory data, the operations comprising:
   receiving, from a computing device associated with a client, a first request;
   obtaining, from a directory service server, client directory data associated with a client;
   providing the client directory data to a computing device associated with the client for caching on the computing device;
   identifying a second request from the client, the second request being a request to access or take action on a secure target resource;
   receiving, from the computing device, the client directory data that was cached on the computing device; and
   evaluating the second request based on the received client directory data;
   determining, based on the client directory data that was cached on the computing device, that the client is permitted to access or take action on the secure target resource in response to the second request.

2. The non-transitory computer readable medium of claim 1, wherein the first request from the client is a request for enrollment of the client in a security service.

3. The non-transitory computer readable medium of claim 1, wherein the operations further comprise, before providing the obtained client directory data to the computing device:
   sending the obtained client directory data associated with the client to a certificate authority server, and
   receiving, from the certificate authority server, a signed version of the client directory data.

4. The non-transitory computer readable medium of claim 3, wherein the client directory data provided to the computing device is the signed version of the client directory data.

5. The non-transitory computer readable medium of claim 4, wherein the client directory data received from the computing device is the signed version of the client directory data.

6. The non-transitory computer readable medium of claim 5, wherein the operations further comprise verifying, based on the certificate authority, the signed version of the client directory data received from the computing device.

7. The non-transitory computer readable medium of claim 1, wherein the client directory data includes at least one of: privileges data, privileged membership data, password data, or personal data.

8. The non-transitory computer readable medium of claim 1, wherein the operations further comprise updating a separate directory resource based on the obtained client directory data.

9. The non-transitory computer readable medium of claim 1, wherein the providing the client directory data to the computing device associated with the client occurs on a periodic basis.

10. The non-transitory computer readable medium of claim 1, wherein the operations further comprise granting the client access to the secure target resource, based on the determination that the client is permitted to access or take action on the secure target resource.

11. A computer-implemented method for managing distributed directory data, the method comprising:
   receiving, from a computing device associated with a client, a first request;
   obtaining, from a directory service server, client directory data associated with a client;
   providing the client directory data to a computing device associated with the client for caching on the computing device;
   identifying a second request from the client, the second request being a request to access or take action on a secure target resource;
   receiving, from the computing device, the client directory data that was cached on the computing device; and
   evaluating the second request based on the received client directory data;
   determining, based on the client directory data that was cached on the computing device, whether the client is permitted to access or take action on the secure target resource in response to the second request.

12. The computer-implemented method of claim 11, further comprising, before providing the obtained client directory data to the computing device, encrypting the obtained client directory data associated with the client.

13. The computer-implemented method of claim 12, wherein the client directory data provided to the computing device is the encrypted version of the client directory data.

14. The computer-implemented method of claim 13, wherein the client directory data received from the computing device is the encrypted version of the client directory data.

15. The computer-implemented method of claim 14, further comprising decrypting the encrypted version of the client directory data.

16. The computer-implemented method of claim 15, further comprising permitting the client to access or take action on the to a secure target resource conditional on a verification of the decrypted version of the encrypted version of the client directory data.

17. The computer-implemented method of claim 13, wherein the client lacks a cryptographic key for decrypting the encrypted version of the client directory data.

18. The computer-implemented method of claim 11, wherein the computing device associated with the client is at least one of: a computing device that locally executes the client or a computing device separate from the client.

19. The computer-implemented method of claim 11, wherein the obtaining, from the directory service, the client directory data associated with the client is performed on a least-privilege basis.

20. The computer-implemented method of claim 11, wherein the client directory data associated with the client has an expiration attribute.

* * * * *